United States Patent
Cooper

(10) Patent No.: US 6,321,079 B1
(45) Date of Patent: Nov. 20, 2001

(54) NETWORK OPERATOR CONTROLLED LOCKING AND UNLOCKING MECHANISM FOR MOBILE TELEPHONES

(75) Inventor: David Edward Cooper, Surrey (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/270,066

(22) Filed: Mar. 16, 1999

(30) Foreign Application Priority Data

Mar. 18, 1998 (GB) .................................................. 9805643

(51) Int. Cl.[7] .............................. H04M 1/66; H04M 3/16
(52) U.S. Cl. ........................ 455/411; 455/410; 455/558; 455/418
(58) Field of Search ................................ 455/411, 410, 455/418, 558; 340/5.2, 5.8; 380/247, 249

(56) References Cited

U.S. PATENT DOCUMENTS 5,668,875 * 9/1997 Brown et al. ...................... 380/248
5,864,757 * 1/1999 Parker ............................... 455/418
5,940,773 * 8/1999 Barvesten ......................... 455/558
6,011,976 * 1/2000 Michaels et al. .................. 455/466

* cited by examiner

*Primary Examiner*—Nay Maung
*Assistant Examiner*—Erika A. Gary
(74) *Attorney, Agent, or Firm*—Sughrue, Mion, Zinn, Macpeak & Seas, PLLC

(57) ABSTRACT

Network operator controlled locking and unlocking mechanism for mobile telephones is disclosed. A method and means for enabling the locking of a mobile telephone to a specified network by the network operator. Locking may be implemented at the point of sale of the mobile telephone. A secret number is embedded in the mobile telephone through the SIM (subscriber identity module) interface in the locking process and the secret number is used subsequently in combination with a random number to allow network unlock. The secret numbers may be indexed and administered in relation to the SIM rather than the mobile telephone.

32 Claims, 2 Drawing Sheets

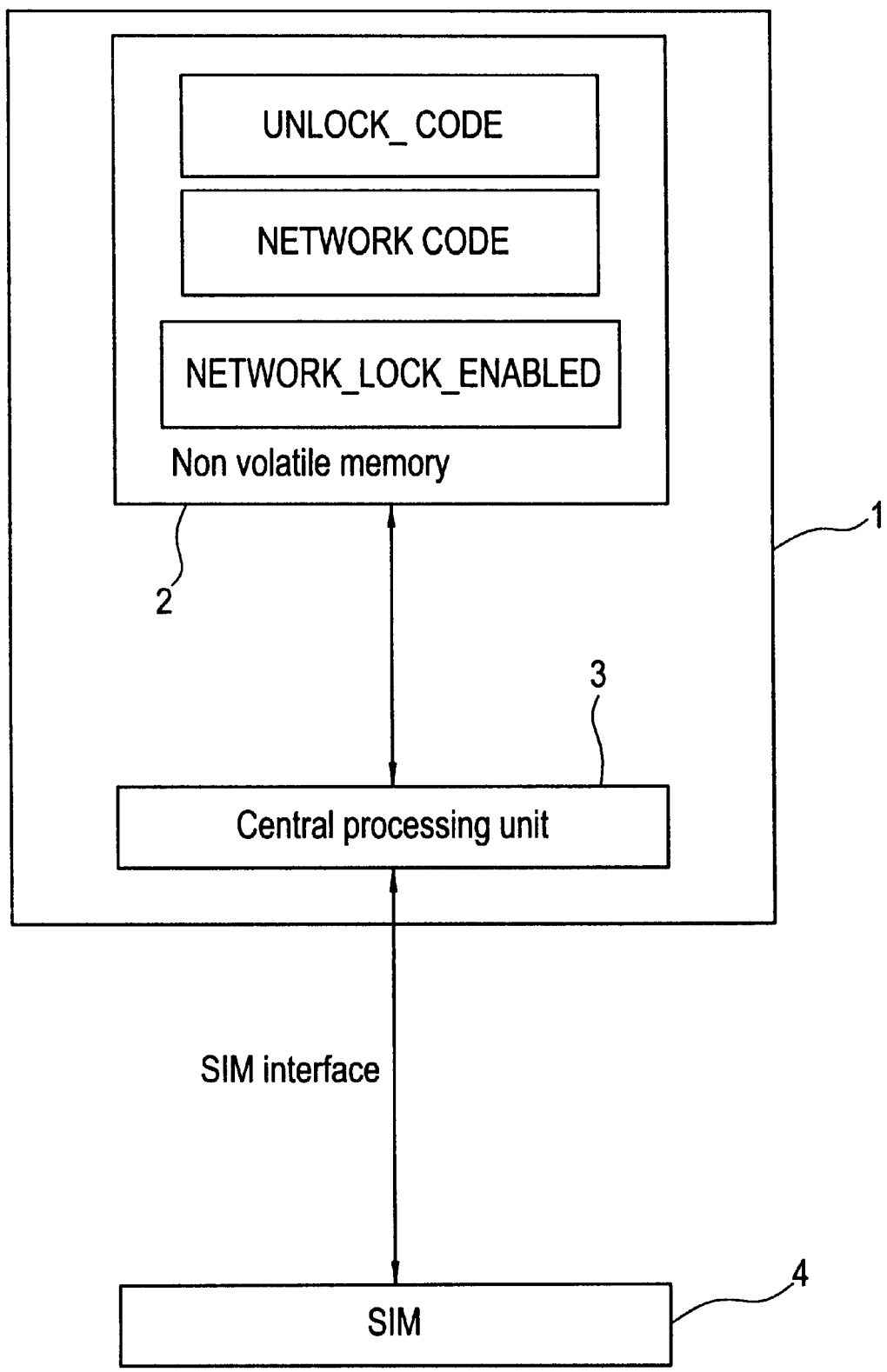

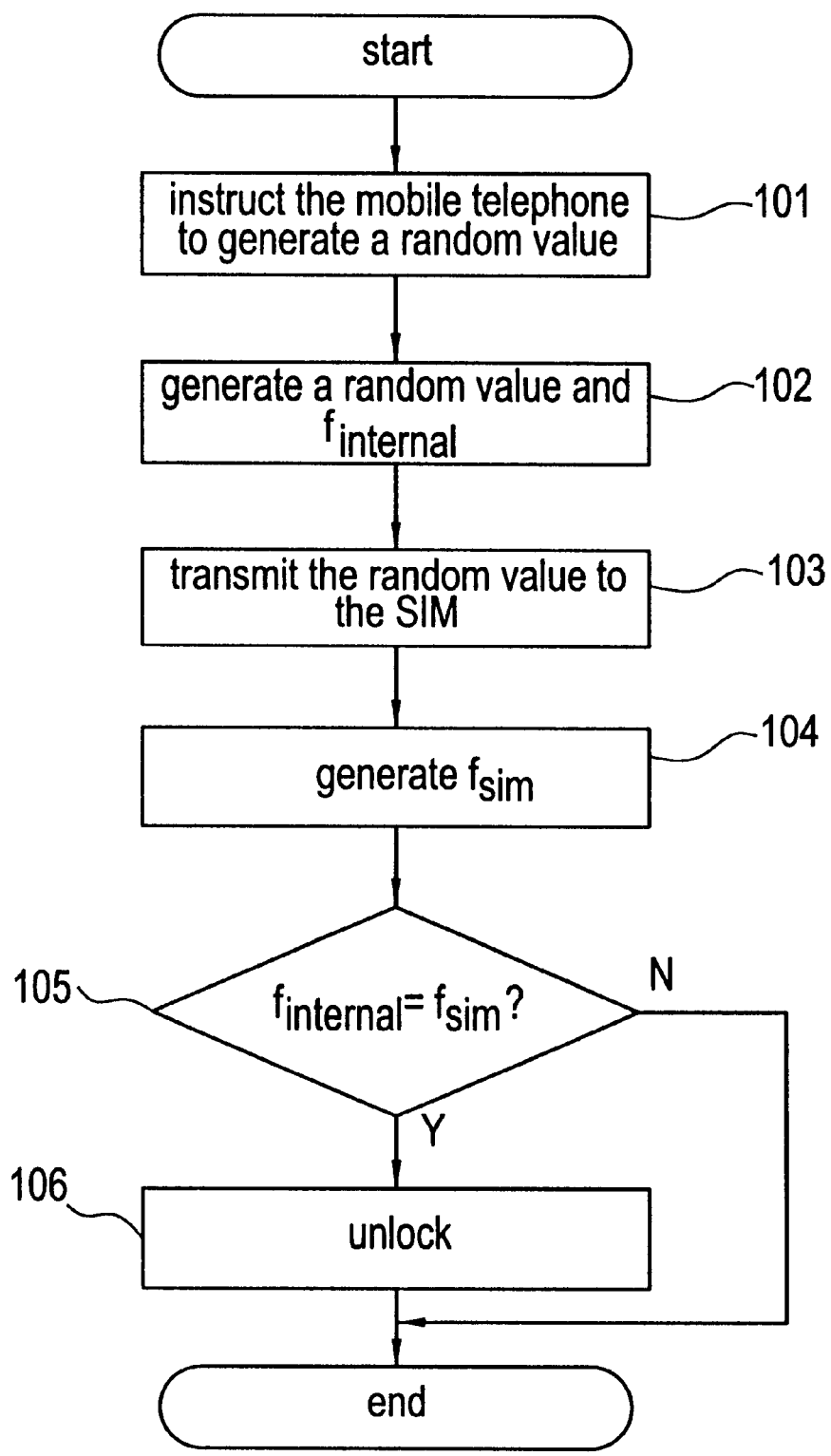

NETWORK OPERATOR CONTROLLED LOCKING AND UNLOCKING MECHANISM FOR MOBILE TELEPHONES

BACKGROUND OF THE INVENTION

1. Field of the Invention

This invention relates to mobile telephones which operate through a radio network and in particular it relates to a security function for restricting the use of individual mobile telephones to radio networks of selected operators.

2. Description of the Related Art

The mobile telephone for which the invention is provided is a digital radio transceiver programmed to operate under the control of a central processing unit (CPU).

Owing to the variations in pricing policy of network operators, the nominal selling price of mobile telephones is often heavily discounted in favor of a higher call tariff. The possibility exists therefore of a user obtaining at very low or even no cost, a mobile telephone for use on a specified network with a relatively high call tariff. If the mobile telephone were then to be used on a low call tariff network for which the charge for mobile telephones remained at full selling price then both network operators would be deprived of revenue. It is important to network operators therefore that use of mobile telephones be restricted to specified networks.

On GSM (Global System for Mobile communication) networks the restriction of mobile telephones to specified networks is sometimes called 'network lock' and this definition of network lock shall be used herein. Network lock for GSM is implemented by ensuring that the mobile telephone will only operate if a SIM (Subscriber Identity Module) belonging to the appropriate network is inserted. The SIM is a smartcard which is attached to the mobile telephone and contains information about the user's subscription (see TS GSM 11.11, 'Digital Cellular Telecommunications System; Specification of Subscriber Identity Module-Mobile Equipment Interface, published by European Telecommunications Standards Institute).

There is a need for a convenient means to be provided to enable the network operator or the agents of the operator to unlock a mobile telephone, for instance at the end of a service contract. It is preferable that this can be carried out without the participation of the manufacturer. The present method is not conductive to this, since it relies on the administration of secret numbers indexed in accordance with mobile telephone equipment numbers.

SUMMARY OF THE INVENTION

An object of this invention is to facilitate the legitimate unlocking of a telephone mobile telephone from a network and in particular to permit the administration of security codes indexed on SIM card numbers. At the same time it must be very difficult for unauthorized parties to reverse network lock.

According to the invention there is provided a method and means for network operator control of locking and unlocking of a mobile telephone to selected networks, the mobile telephone having a secret number, stored in non volatile memory, and prevision for generating a random number to be used in combination with the secret number stored in the mobile telephone to provide a first function for comparison with a second function generated by the same combination of secret number and random number used to provide said first function.

This invention has two important advantages over the arrangements described in GSM 02.22 (Digital Cellular telecommunications system: personalization of GSM Mobile Equipment, published by European Telecommunications Standards Institute).

Firstly in this invention, the administration of secret numbers is performed on the basis of each SIM and not on the basis of each mobile telephone. Therefore it is convenient for the operator rather than the manufacturer to administer secret numbers, since the operator necessarily maintains a list of SIMs as an essential part of his business (since the SIM contains subscriber information). The operator does not, necessarily, hold a list of mobile telephone serial numbers.

Secondly network locking and unlocking takes place over a standardized interface (the SIM-Mobile Equipment interface), and does not require manual entry or techniques specific to manufacturers.

Mobile telephones may be locked to the network at the time that they are matched with a SIM (which is typically the moment at which they are purchased by the customer and thus attract the operator subsidy). The mobile telephones would then be delivered to the operator or his agent in an unlocked state after the manufacturing process. An unlocked mobile telephone can be used with any network.

Network lock is enforced by embedding a 'secret' number into the mobile telephone. Once this number is embedded into the mobile telephone, it will only function with a SIM that has access to this number. This number is embedded in the mobile telephone when the mobile telephone is paired with a SIM.

This secret number can be unique to each SIM-mobile telephone pair, or can be shared by more than one SIM. The secret numbers can be administered by the operator (who in any case has to maintain a record of SIMs), without the need for the manufacturer to be involved. Indeed, the secret number can be pre-programmed into the SIM before it is delivered to the operators agent. Alternatively the secret number can be transmitted to the SIM via the operator's radio network, for example when a call is made after the mobile telephone has been paired with a SIM.

The SIM interface is also used to undo network lock when required. This can be performed by the same SIM that has been paired with the mobile, or any other equipment which connects to the SIM interface with knowledge of the secret number. Unauthorized de-activation of network lock can be protected by whatever security measures the operator deems appropriate, which would typically require knowledge of the 'secret' number.

The above and other objects, features and advantages of the present invention will become apparent from the following description with reference to the accompanying drawings which illustrate examples of the present invention.

BRIEF DESCRIPTION OF THE DRAWINGS

FIG. 1 is a simplified diagram illustrating the locking and unlocking mechanism; and FIG. 2 is a flaw chart illustrating the unlocking operation of the embodiment of the present invention.

DETAILED DESCRIPTION OF THE PREFERRED EMBODIMENTS

One embodiment of the invention will now be described with reference to the single FIG. 1 which is a simplified diagram illustrating the locking and unlocking mechanism.

The mobile telephone 1 includes a non volatile memory 2 a central processing unit 3 and a SIM(subscriber identity module) 4. The SIM 4 is connected to the mobile telephone 1 via the SIM interface.

Within the mobile telephone are the following elements: NETWORK_LOCK_ENABLED flag, a binary flag in non volatile memory which indicates to the mobile telephone: UNLOCK_CODE, a secret value held in non volatile memory which can take values from a large range (e.g. 32 bits). NETWORK_CODE, a list of network codes with which the mobile will operate.

These elements may be protected against unauthorized tampering by the normal means that the manufacturer uses to protect other secure elements.

Both the SIM and the mobile telephone are capable of running a security algorithm f( ), which must have the following properties.

Property 1: The algorithm f( ) takes two parameters, one of them UNLOCK_CODE f( )=f(RAND, UNLOCK_CODE)

Where the parameter RAND can be randomly chosen from a large range of possibilities (e.g. 32 bits).

Property 2: The algorithm f(RAND, x) cannot be inverted, i.e. x cannot be deduced from knowledge of f(RAND, x) and RAND.

Property 3: The set of values that f( ) can take is so large that a guess is very unlikely to be successful (e.g. 32 bits).

Examples of such algorithms are well known and the above requirements specify a 'random challenge authentication' procedure. For example, the GSM A3 algorithm is widely used for this purpose (see TS GSM 03.20, 'Security Related Network Functions' published by European Telecommunications Standards Institute).

The mobile telephone is at all times in one of two exclusive states: either locked to network(s) or unlocked. When the mobile telephone is not locked to a network(s), the operation of locking may be instituted by any SIM. Once the mobile telephone is locked, however, then subsequent unlocking requires knowledge of the value of UNLOCK_CODE.

Network lock is activated using the SIM interface, typically by the SIM with which the mobile telephone is paired. The SIM instructs the mobile telephone to set the internal NETWORK_LOCK_ENABLED flag and provides the secret number, UNLOCK_CODE, to the mobile telephone.

The value of UNLOCK_CODE need only be known to the entity responsible for programming of the SIM, and its value within the SIM would be protected from discovery or change by normal SIM security measures.

The SIM transmits the allowed network code(or codes) to the mobile, NETWORK_CODE (in GSM, this would be MCC+MNC in accordance with TS GSM 03.03).

Once the NETWORK_LOCK_ENABLED flag is set to true, the mobile will then only operate if a SIM connected to it contains the correct network code. In GSM the network code is embedded in the subscriber identity number, which must necessarily be provided to the mobile telephone in order for a call to take place.

The reversal of network lock is initiated by the SIM, which can be instructed to do so by the operator (protected by appropriate security procedures). Reversal of network lock is performed in one atomic operation to ensure that a malicious party cannot reverse network lock by tampering with the communication on the SIM interface after the SIM is validated.

The operation of reversal of network lock is next explained with reference to FIG. 2. At step 101, the SIM instructs the mobile telephone to generate a random number RAND, which changes on every occasion. At step 102, this is used along with UNLOCK_CODE to generate.

$f_{internal}$=f(RAND, UNLOCK_CODE).

At step 103, the value RAND is also transmitted to the SIM.

At step 104, the SIM then generates:

$f_{sim}$=f(RAND, UNLOCK CODE) and transmits it back to the mobile telephone. At decision step 105, a check is made to determine if the value $f_{sim}$ returned from the SIM matches the internally generated $f_{internal}$. If and only if the value $f_{sim}$ matches the internally generated $f_{internal}$ will the mobile telephone reverse network lock at step 106. It is extremely unlikely that a SIM would generate a correct value without having knowledge of UNLOCK_CODE, since RAND is chosen from a large range of possibilities.

Note that f( ) is not invertible: knowledge of RAND and $f_{sim}$ does not allow the value UNLOCK_CODE to be derived (other than by many repeated observations combined with sophisticated decryption techniques). Since RAND changes every time and can take a very large range of values, observation of previous exchanges on the SIM interface is unlikely to be of use in deriving the value of UNLOCK_CODE.

While a preferred embodiment of the present invention has been described using specific terms, such description is for illustrative purposes only, and it is to be understood that changes and variations may be made without departing from the spirit or scope of the following claims.

What is claimed is:

1. A method for network operator control of locking and unlocking of a mobile telephone to selected networks, said method comprising the steps of:

causing said mobile telephone to store a secret number therein by an outer-module at the time of network locking;

instructing said mobile telephone to generate a random number by said outer-module at the time of network unlocking;

generating a random number, transmitting said random number to said outer-module, and generating a first value using said secret number and said random number by said mobile telephone;

generating a second value using said secret number and said random number transmitted from said mobile telephone by said outer-module;

transmitting said second value back to the mobile telephone by said outer-module; and unlocking the network lock by said mobile telephone when said second value returned from said outer-module matches said first value.

2. A method for network operator control according to claim 1 wherein said outer-module is the SIM (subscriber identity module).

3. A method for network operator control according to claim 2 wherein the function which generates said first value and said second value using said secret number and said random number is based on random challenge authentication algorithms.

4. A method for network operator control according to claim 3 wherein said random challenge authentication algorithms are constructed in accordance with the GSM A3 of TS GSM 03.20, 'Security Related Network Functions' published by European Telecommunications Standards Institute.

5. A method for network operator control according to claim 1 wherein said secret number is transmitted to said outer-module over the air interface.

6. A method for network operator control according to claim 5 wherein said outer-module is the SIM (subscriber identity module).

7. A method for network operator control according to claim 1 wherein the function which generates said first value and said second value using said secret number and said random number is based on random challenge authentication algorithms.

8. A method for network operator control according to claim 7 wherein said random challenge authentication algorithms are constructed in accordance with the GSM A3 of TS GSM.03.20, 'Security Related Network Functions' published by European Telecommunications Standards Institute.

9. A mobile telephone comprising:
a non volatile memory for storing a secret number transmitted from an outer-module and network lock enabled flag indicating the current condition of a network lock; and
a central processing unit for causing said non volatile memory to store said secret number transmitted from said outer-module at the time of network locking, generating a random number in accordance with instructions transmitted from said outer-module at the time of network locking, transmitting said random number to said outer-module, generating a first value using said secret number stored in said non volatile memory and said random number, and unlocking the network lock when a second value returned from said outer-module matches said first value.

10. A mobile telephone according to claim 9 wherein said outer-module is the SIM (subscriber identity module).

11. A mobile telephone according to claim 10 wherein the function which generates said first value and said second value using said secret number and said random number is based on random challenge authentication algorithms.

12. A mobile telephone according to claim 11 wherein said random challenge authentication algorithms are constructed in accordance with the GSM A3 of TS GSM 03.20, 'Security Related Network Functions' published by European Telecommunications Standards Institute.

13. A mobile telephone according to claim 9 wherein said secret number is transmitted to said outer-module over the air interface.

14. A mobile telephone according to claim 13 wherein said outer-module is the SIM (subscriber identity module).

15. A mobile telephone according to claim 9 wherein the function which generates said first value and said second value using said secret number and said random number is based on random challenge authentication algorithms.

16. A mobile telephone according to claim 15 wherein said random challenge authentication algorithms are constructed in accordance with the GSM A3 of TS GSM 03.20, 'Security Related Network Functions' published by European Telecommunications Standards Institute.

17. A method for locking and unlocking of a mobile terminal to particular networks, comprising:
(a) storing a secret number in said mobile terminal;
(b) generating a random number by said mobile terminal;
(c) supplying said random number from said mobile terminal to a module device;
(d) generating a first value via said mobile terminal, wherein said first value is generated based on said secret number and said random number;
(e) generating a second value via said module device, wherein said second value is generated using said random number supplied from said mobile terminal and said secret number; and
(f) unlocking a network lock of said mobile terminal when said second value corresponds to said first value.

18. The method as claimed in claim 17, wherein said mobile terminal comprises a mobile telephone.

19. The method as claimed in claim 17, wherein said module device comprises a subscriber identity module.

20. The method as claimed in claim 17, wherein said operation (a) comprises:
(a1) outputting said secret number from said module device to said mobile terminal; and
(a2) storing said secret number in said mobile terminal.

21. The method as claimed in claim 20, wherein said operation (b) comprises:
(b1) outputting an instruction from said module device to said mobile terminal; and
(b2) generating said random number by said mobile terminal in response to said instruction, and wherein said operation (f) comprises:
(f1) outputting said second value from said module device to said mobile terminal;
(f2) determining, via said mobile terminal, a relationship between said first value and said second value; and
(f3) unlocking said network lock of said mobile terminal when said second value corresponds to said first value.

22. The method as claimed in claim 17, wherein said operation (b) comprises:
(b1) outputting an instruction from said module device to said mobile terminal; and
(b2) generating said random number by said mobile terminal in response to said instruction.

23. The method as claimed in claim 17, wherein said operation (f) comprises:
(f1) outputting said second value from said module device to said mobile terminal;
(f2) determining, via said mobile terminal, a relationship between said first value and said second value; and
(f3) unlocking said network lock of said mobile terminal when said second value corresponds to said first value.

24. The method as claimed in claim 23, wherein said operation (f3) comprises:
(f3a) unlocking said network lock of said mobile terminal when said second value equals said first value.

25. A mobile terminal system, comprising:
a module device; and
a mobile terminal having a memory and a processor,
wherein said memory stores a secret number,
wherein said processor generates a random number and supplies said random number to said module device,
wherein said processor generates a first value based on said secret number and said random number,
wherein said module device generates a second value using said random number supplied from said mobile terminal and said secret number, and
wherein said processor unlocks a network lock of said mobile terminal when said second value corresponds to said first value.

26. The system as claimed in claim 25, wherein said memory is a non-volatile memory.

27. The system as claimed in claim 25, wherein said mobile terminal comprises a mobile telephone.

28. The system as claimed in claim 25, wherein said module device comprises a subscriber identity module.

29. The system as claimed in claim 25, wherein said module device outputs said secret number to said mobile terminal before said secret number is stored in said memory.

30. The system as claimed in claim 25, wherein said module device outputs an instruction to said processor, and
wherein said processor generates said random number in response to said instruction.

31. The system as claimed in claim 25, wherein said module device outputs said second value to said processor,
wherein said processor determines a relationship between said first value and said second value, and
wherein said processor unlocks said network lock of said mobile terminal when said second value corresponds to said first value.

32. The system as claimed in claim 31, wherein said processor unlocks said network lock of said mobile terminal when said second value equals said first value.

* * * * *